US012804031B2

(12) United States Patent
Kutch et al.

(10) Patent No.: US 12,804,031 B2
(45) Date of Patent: Nov. 17, 2026

(54) NETWORK INTERFACE DEVICE TO SELECT A TARGET SERVICE BASED ON PROXIMITY OF THE TARGET SERVICE

(71) Applicant: Intel Corporation, Santa Clara, CA (US)

(72) Inventors: Patrick G. Kutch, Tigard, OR (US); Carolyn Wyborny, Forest Grove, OR (US); Ziye Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/205,984

(22) Filed: Jun. 5, 2023

(65) Prior Publication Data

US 2023/0319133 A1 Oct. 5, 2023

Related U.S. Application Data

(63) Continuation-in-part of application No. 17/955,797, filed on Sep. 29, 2022.

(30) Foreign Application Priority Data

Aug. 29, 2022 (WO) ................ PCT/CN2022/115525
May 16, 2023 (WO) ................ PCT/CN2023/094424

(51) Int. Cl.
*H04L 67/101* (2022.01)

(52) U.S. Cl.
CPC .................................. *H04L 67/101* (2013.01)

(58) Field of Classification Search
CPC . H04L 67/01; H04L 67/1004; H04L 67/1008; H04L 67/101; H04L 67/1012; H04L 67/1014; H04L 67/1021; H04L 67/63; H04L 67/50; H04L 67/60; H04L 9/40; H04L 61/09; H04L 63/00; H04L 65/60; H04L 65/61; H04L 65/611; H04L 65/612; H04L 65/613; H04L 65/65; H04L 65/70; H04L 65/75; H04L 65/752; H04L 65/756; H04L 67/1001; H04L 67/10015;
(Continued)

(56) References Cited

U.S. PATENT DOCUMENTS 7,343,560 B1 3/2008 Tanner et al.
10,901,700 B2 1/2021 Wang et al.
(Continued)

FOREIGN PATENT DOCUMENTS

WO WO-2017062014 A1 * 4/2017 ............. H04L 67/61

OTHER PUBLICATIONS

Chang, Emily, "Monitoring services and setting SLAs with Datadog", https://www.datadoghq.com/blog/set-and-monitor-slas/, Last updated Apr. 8, 2019, 15 pages.
(Continued)

*Primary Examiner* — Johnny B Aguiar
(74) *Attorney, Agent, or Firm* — Compass IP Law PC

(57) ABSTRACT

Examples described herein relate to a network interface device that includes a network interface and circuitry. In some examples, the circuitry is to receive a request to perform a service and select a servicing node based on network latency and/or proximity of the requested service to the network interface device. In some examples, a proximity of the requested service includes execution in the network interface device.

23 Claims, 10 Drawing Sheets

(58) Field of Classification Search
CPC .. H04L 67/131; H04L 67/133; H04L 67/1396
See application file for complete search history.

(56) References Cited

U.S. PATENT DOCUMENTS

| | | | | |
|---|---|---|---|---|
| 11,573,814 | B1 | 2/2023 | Aithal et al. | |
| 11,803,303 | B1 | 10/2023 | Huo et al. | |
| 2005/0138638 | A1* | 6/2005 | Pilkington | G06F 9/5027 719/316 |
| 2016/0044095 | A1* | 2/2016 | Sankar | H04L 67/1012 709/223 |
| 2017/0026461 | A1* | 1/2017 | Boutros | H04L 45/125 |
| 2018/0225237 | A1 | 8/2018 | Edirisooriya et al. | |
| 2019/0222518 | A1* | 7/2019 | Bernat | H04L 47/125 |
| 2020/0389410 | A1* | 12/2020 | Guim Bernat | H04L 67/10 |
| 2021/0255846 | A1 | 8/2021 | Mamgain et al. | |
| 2021/0328886 | A1* | 10/2021 | Guim Bernat | H04L 41/5022 |
| 2022/0225226 | A1* | 7/2022 | Yang | H04L 43/08 |
| 2023/0319133 | A1 | 10/2023 | Kutch et al. | |
| 2023/0325080 | A1 | 10/2023 | Huo et al. | |
| 2024/0012666 | A1* | 1/2024 | Gao | H04L 9/0643 |
| 2024/0356887 | A1* | 10/2024 | Maskara | H04L 63/20 |
| 2025/0036401 | A1 | 1/2025 | Ross et al. | |

OTHER PUBLICATIONS

Chen, Bin, "Open Container Initiative (OCI) Specifications", https://www.alibabacloud.com/blog/open-container-initiative-oci-specifications_594397, Alibaba Cloud, Jan. 18, 2019, 8 pages.

Confidential Containers, "Welcome to Confidential Containers", https://github.com/confidential-containers, Downloaded from internet Jun. 9, 2023, 4 pages.

Crippa, Francisco Sedano, "Understanding Container Images, Part 1: Image Layers", https://blogs.cisco.com/developer/container-image-layers-1, Cisco Blogs, Jan. 25, 2021, 16 pages.

Crippa, Francisco Sedano, "Understanding Container Images, Part 3: Working with Overlays", https://blogs.cisco.com/developer/373-containerimages-03, Cisco Blogs, Feb. 16, 2021, 10 pages.

Desarda, Akash, "A complete guide to building a Docker Image serving a Machine learning system in Production", https://towardsdatascience.com/a-complete-guide-to-building-a-docker-image-serving-a-machine-learning-system-in-production-d8b5b0533bde, Published in Towards Data Science, Feb. 2021, 13 pages.

Kubernetes, "Pull an Image from a Private Registry", https://kubernetes.io/docs/tasks/configure-pod-container/pull-image-private-registry/, Last updated Jan. 13, 2023, 5 pages.

Odd Bit Blog, "Unpacking Docker images with Undocker", https://blog.oddbit.com/post/2015-02-13-unpacking-docker-images/, Feb. 2015, Last updated Feb. 2023, 5 pages.

OpenFaaS, CLI "Build Functions", https://docs.openfaas.com/cli/build/, An independent open-source project created in 2016, 10 pages.

OpenFaaS, Stack, "Layers and responsibilities", https://docs.openfaas.com/architecture/stack/#layers-and-responsibilities, An independent open-source project created in 2016, 3 pages.

Vivid Code, "Understanding OCI Image Spec", https://vividcode.io/understanding-oci-image-spec/, Dec. 28, 2021, 10 pages.

First Office Action for U.S. Appl. No. 17/955,797, Mailed Dec. 3, 2025, 17 pages.

U.S. Appl. No. 17/955,797, Figures 1 and 2 Known Prior Art, Apr. 2022.

Notice of Allowance for U.S. Appl. No. 17/955,797, Mailed Apr. 14, 2026, 10 pages.

* cited by examiner

NETWORK INTERFACE DEVICE TO SELECT A TARGET SERVICE BASED ON PROXIMITY OF THE TARGET SERVICE

RELATED APPLICATIONS

This application claims priority to PCT/CN2023/94424, filed May 16, 2023. The entire contents of that application are incorporated by reference in its entirety.

This application claims priority to PCT/CN2022/115525, filed Aug. 29, 2022. The entire contents of that application are incorporated by reference in its entirety.

This application is a continuation-in-part of U.S. application Ser. No. 17/955,797, filed Sep. 29, 2022.

DESCRIPTION

Cloud service providers (CSPs) provide various services and services can be deployed as micro-services within the CSP's infrastructure, such as by use of multiple instances of services deployed within a datacenter. Execution of a service can make calls to encryption, decryption, compression, decompression, and other services. When an application makes a call to a service, a load balancer can balance out the requests among the deployed instances of the service. Latency of execution of a service can vary based on a physical proximity of a platform that executes a target service (e.g., same server, same rack, different rack, or different data center). In some cases, a given call to a service could result in tens of hops across switches in the datacenter while a subsequent call may only travel a hop through a single switch if the service instance servicing the request is in the same rack as the client application. Certain customers and applications demand consistent latency of service execution according to service level agreement (SLA) parameters.

DETAILED DESCRIPTION

For called services, in order to attempt to meet associated latency parameters, various examples can utilize a network interface device that includes circuitry that can be configured by a requester to select a target service based on a range of number of permitted hops. In some examples, the network interface device includes circuitry that can perform load balancing of requests among potential target services. In some examples, the load balancer can consider Time To Live (TTL) (e.g., number of network hops) to select among instances of a target service. For example, the network interface device can execute Kubernetes-based load balancer in a compute complex of the network interface device offloaded from a host central processing unit (CPU). When a requester that is using a higher tier subscription to a service subsequently makes a call to that service, the requester can send the request to the network interface device and the network interface device can determine a subscription level for the requester and choose an instance of the target service that complies within the SLA tier associated with the requester. For example, a highest level of SLA might include selection of a target service that executes on the compute complex cores of the network interface device itself, resulting in no network hops to the target service.

Figure 1A:
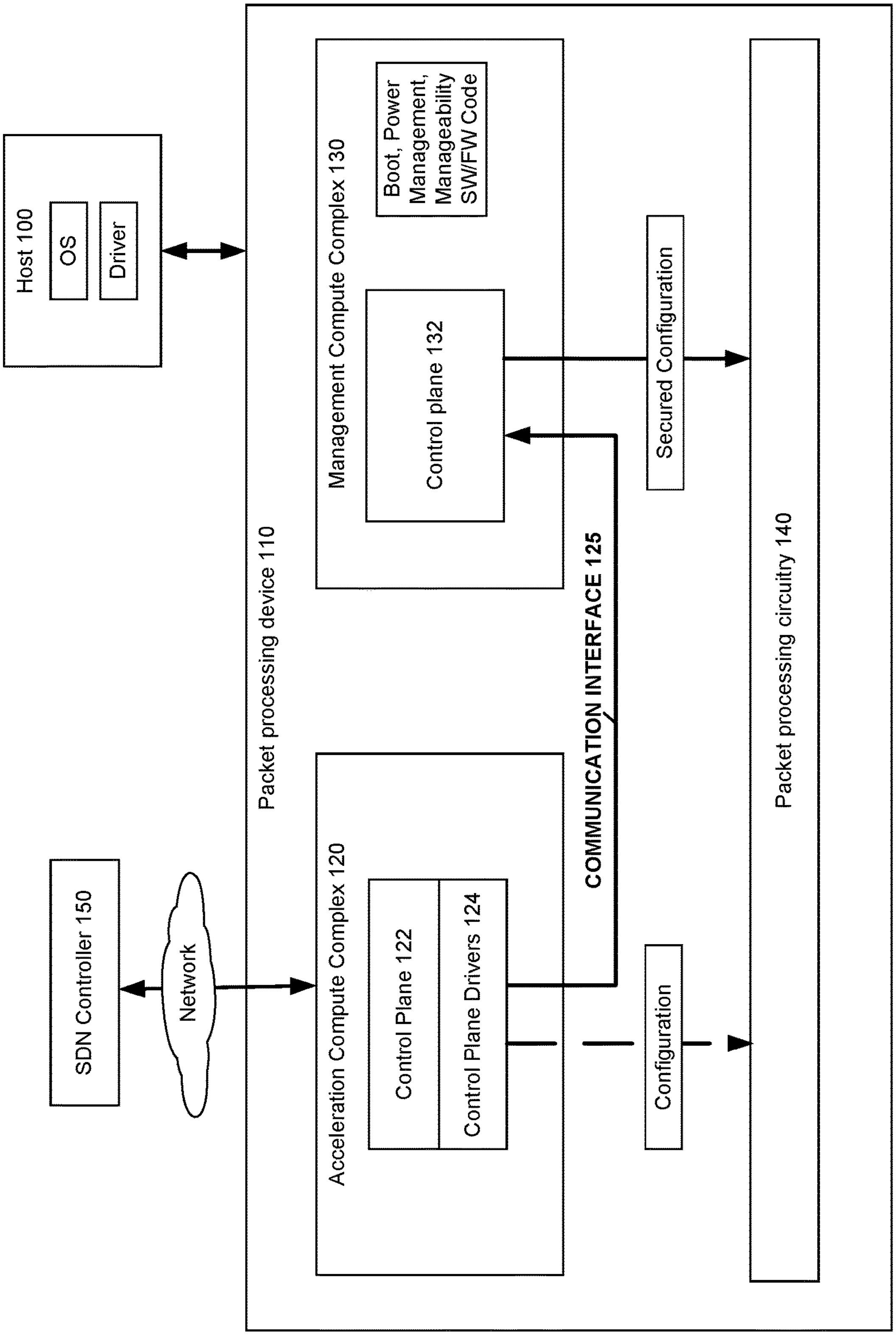
FIG. 1A depicts an example system.

FIG. 1A depicts an example system. Host 100 can include processors, memory devices, device interfaces, as well as other circuitry such as described with respect to one or more of FIGS. 7-9. Processors of host 100 can execute software such as applications (e.g., microservices, virtual machine (VMs), microVMs, containers, processes, threads, or other virtualized execution environments), operating system (OS), and device drivers. An OS or device driver can configure network interface device or packet processing device 110 to utilize one or more control planes to communicate with software defined networking (SDN) controller 150 via a network to configure operation of the one or more control planes.

Packet processing device or data plane circuitry 110 can include multiple compute complexes, such as an Acceleration Compute Complex (ACC) 120 and Management Compute Complex (MCC) 130, as well as packet processing circuitry 140 and network interface technologies for communication with other devices via a network. ACC 120 can be implemented as one or more of: a microprocessor, processor, accelerator, field programmable gate array (FPGA), application specific integrated circuit (ASIC) or circuitry described at least with respect to FIGS. 5-7. Similarly, MCC 130 can be implemented as one or more of: a microprocessor, processor, accelerator, field programmable gate array (FPGA), application specific integrated circuit (ASIC) or circuitry described at least with respect to FIGS. 5-7. In some examples, ACC 120 and MCC 130 can be implemented as separate cores in a CPU, different cores in different CPUs, different processors in a same integrated circuit, different processors in different integrated circuit.

Figure 5:
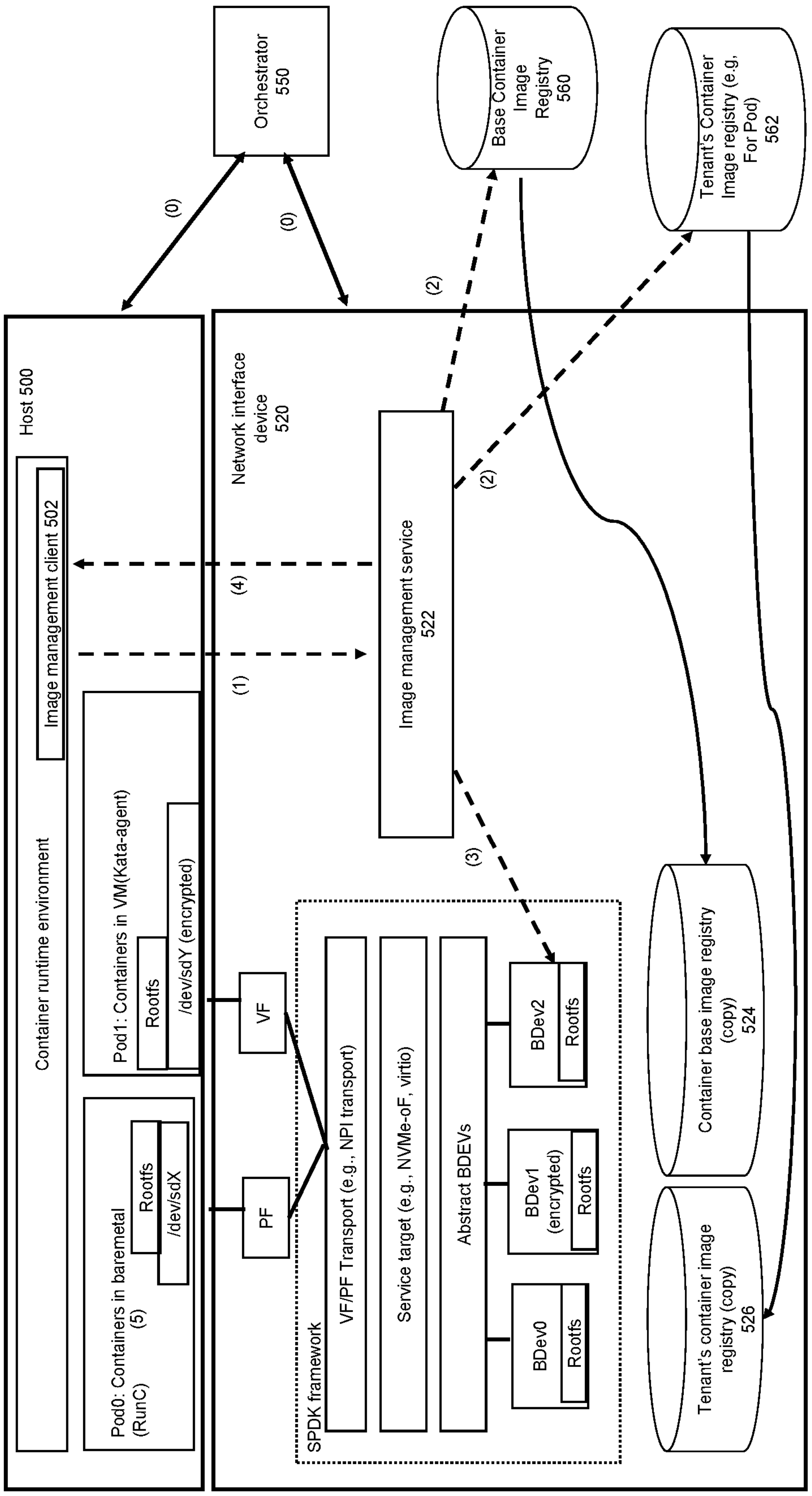
FIG. 5 depicts an example system.
Figure 6:
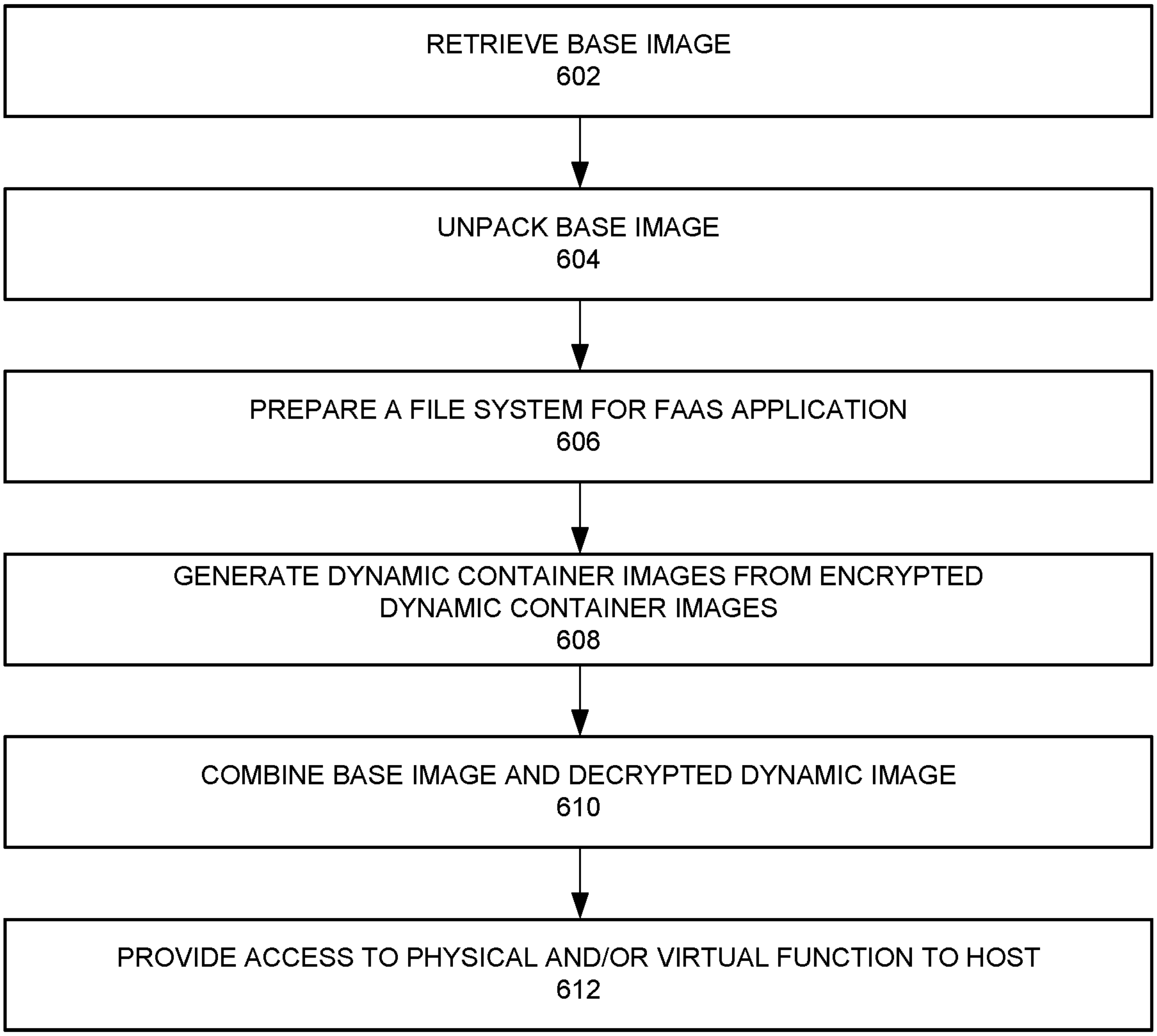
FIG. 6 depicts an example process.
Figure 7:
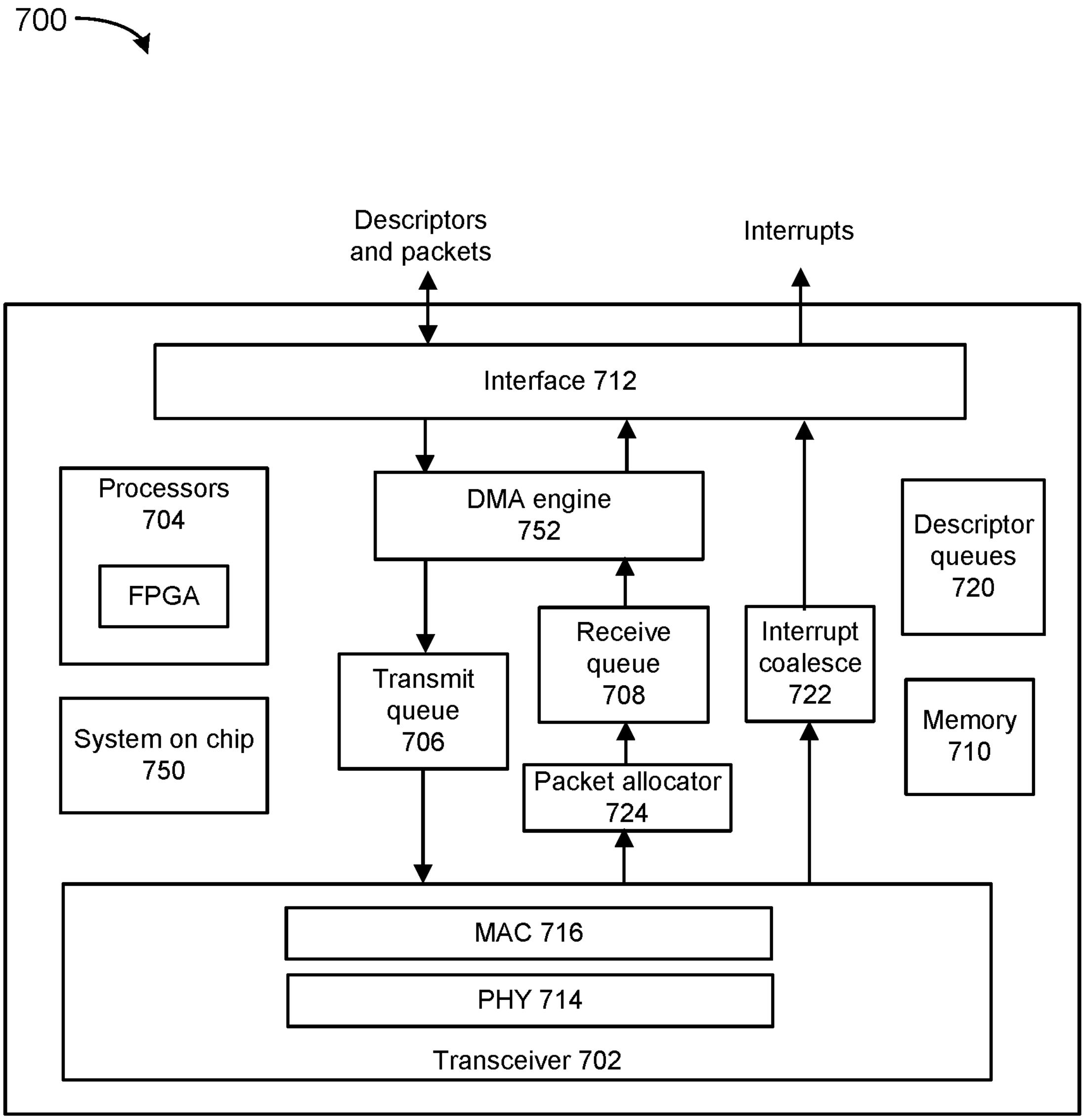
FIG. 7 depicts an example network interface.

Packet processing device 110 can be implemented as one or more of: a microprocessor, processor, accelerator, field programmable gate array (FPGA), application specific integrated circuit (ASIC) or circuitry described at least with respect to FIGS. 5-7. Packet processing pipeline circuitry 140 can process packets as directed or configured by one or more control planes executed by multiple compute complexes. In some examples, ACC 120 and MCC 130 can execute respective control planes 122 and 132.

SDN controller 150 can upgrade or reconfigure software executing on ACC 120 (e.g., control plane 122 and/or control plane 132) through contents of packets received through packet processing device 110. In some examples, ACC 120 can execute control plane operating system (OS) (e.g., Linux) and/or a control plane application 122 (e.g., user space or kernel modules) used by SDN controller 150 to configure operation of packet processing pipeline 140. Control plane application 122 can include Generic Flow Tables (GFT), VMware ESXi, VMware NSX, Kubernetes control plane software, application software for managing crypto configurations, Programming Protocol-independent Packet Processors (P4) runtime daemon, target specific daemon, Container Storage Interface (CSI) agents, or remote direct memory access (RDMA) configuration agents.

In some examples, SDN controller 150 can communicate with ACC 120 using a remote procedure call (RPC) such as Google remote procedure call (gRPC) or other service and ACC 120 can convert the request to target specific protocol buffer (protobuf) request to MCC 130. gRPC is a remote procedure call solution based on data packets sent between a client and a server. Although gRPC is an example, other communication schemes can be used such as, but not limited to, Java Remote Method Invocation, Modula-3, Remote Python Call (RPyC), Distributed Ruby, Erlang, Elixir, Action Message Format, Remote Function Call, Open Network Computing RPC, JavaScript Object Notation-Remote Procedure Call (JSON-RPC), and so forth.

In some examples, SDN controller 150 can provide packet processing rules for performance by ACC 120. For example, ACC 120 can program table rules (e.g., header field match and corresponding action) applied by packet processing pipeline circuitry 140 based on change in policy and changes in VMs, containers, microservices, applications, or other processes. ACC 120 can be configured to provide network policy as flow cache rules into a table to configure operation of packet processing pipeline 140. For example, the ACC-executed control plane application 122 can configure rule tables applied by packet processing pipeline circuitry 140 with rules to define a traffic destination based on packet type and content. ACC 120 can program table rules (e.g., match-action) into memory accessible to packet processing pipeline circuitry 140 based on change in policy and changes in VMs.

A flow can be a sequence of packets being transferred between two endpoints, generally representing a single session using a protocol. Accordingly, a flow can be identified, using a match, by a set of defined tuples and, for routing purpose, a flow is identified by the two tuples that identify the endpoints, e.g., the source and destination addresses. For content-based services (e.g., load balancer, firewall, Intrusion detection system etc.), flows can be identified at a finer granularity by using N-tuples (e.g., source address, destination address, Internet Protocol (IP) protocol, transport layer source port, and destination port). A packet in a flow is expected to have the same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier.

For example, ACC 120 can execute a virtual switch such as vSwitch or Open vSwitch (OVS), Stratum, or Vector Packet Processing (VPP) that provides communications between virtual machines executed by host 200 or with other devices connected to a network. For example, ACC 120 can configure packet processing pipeline circuitry 140 as to which VM is to receive traffic and what kind of traffic a VM can transmit. For example, packet processing pipeline circuitry 140 can execute a virtual switch such as vSwitch or Open vSwitch that provides communications between virtual machines executed by host 100 and packet processing device 110.

MCC 130 can execute a host management control plane, global resource manager, and perform hardware registers configuration. Control plane 132 executed by MCC 130 can perform provisioning and configuration of packet processing circuitry 140. For example, a VM executing on host 100 can utilize packet processing device 110 to receive or transmit packet traffic. MCC 130 can execute boot, power, management, and manageability software (SW) or firmware (FW) code to boot and initialize the packet processing device 110, manage the device power consumption, provide connectivity to Baseboard Management Controller (BMC), and other operations.

One or both control planes of ACC 120 and MCC 130 can define traffic routing table content and network topology applied by packet processing circuitry 140 to select a path of a packet in a network to a next hop or to a destination network-connected device. For example, a VM executing on host 100 can utilize packet processing device 110 to receive or transmit packet traffic.

ACC 120 can execute control plane drivers to communicate with MCC 130. At least to provide a configuration and provisioning interface between control planes 122 and 132, communication interface 125 can provide control-plane-to-control plane communications. Control plane 132 can perform a gatekeeper operation for configuration of shared resources. For example, via communication interface 125, ACC control plane 122 can communicate with control plane 132 to perform one or more of: determine hardware capabilities, access the data plane configuration, reserve hardware resources and configuration, communications between ACC and MCC through interrupts or polling, subscription to receive hardware events, perform indirect hardware registers read write for debuggability, flash and physical layer interface (PHY) configuration, or perform system provisioning for different deployments of network interface device such as: storage node, tenant hosting node, microservices backend, compute node, or others.

Communication interface 125 can be utilized by a negotiation protocol and configuration protocol running between ACC control plane 122 and MCC control plane 132. Communication interface 125 can include a general purpose mailbox for different operations performed by packet processing circuitry 140. Examples of operations of packet processing circuitry 140 include issuance of non-volatile memory express (NVMe) reads or writes, issuance of Non-volatile Memory Express over Fabrics (NVMe-oF™) reads or writes, lookaside crypto Engine (LCE) (e.g., compression or decompression), Address Translation Engine (ATE) (e.g., input output memory management unit (IOMMU) to provide virtual-to-physical address translation), encryption or decryption, configuration as a storage node, configuration as a tenant hosting node, configuration as a compute node, provide multiple different types of services between different Peripheral Component Interconnect Express (PCIe) end points, or others.

Communication interface 125 can include one or more mailboxes accessible as registers or memory addresses. For communications from control plane 122 to control plane 132, communications can be written to the one or more mailboxes by control plane drivers 124. For communications from control plane 132 to control plane 122, communications can be written to the one or more mailboxes. Communications written to mailboxes can include descriptors which include message opcode, message error, message parameters, and other information. Communications written to mailboxes can include defined format messages that convey data.

Communication interface 125 can provide communications based on writes or reads to particular memory addresses (e.g., dynamic random access memory (DRAM)), registers, other mailbox that is written-to and read-from to pass commands and data. To provide for secure communications between control planes 122 and 132, registers and memory addresses (and memory address translations) for communications can be available only to be written to or read from by control planes 122 and 132 or cloud service provider (CSP) software executing on ACC 120 and device vendor software, embedded software, or firmware executing on MCC 130. In some examples, communications (e.g., messages, descriptors, and/or data communicated) between ACC 120 and MCC 130 can be encrypted whereby a sender can encrypt the communications and the receiver can decrypt the received communications based on a key.

Communication interface 125 can support communications between multiple different compute complexes such as from host 100 to MCC 130, host 100 to ACC 120, MCC 130 to ACC 120, baseboard management controller (BMC) to MCC 130, BMC to ACC 120, or BMC to host 100.

Packet processing circuitry 140 can be implemented using one or more of: application specific integrated circuit (ASIC), field programmable gate array (FPGA), processors executing software, or other circuitry. Control plane 122 and/or 132 can configure packet processing pipeline circuitry 140 or other processors to perform operations related to NVMe, NVMe-oF reads or writes, lookaside crypto Engine (LCE), Address Translation Engine (ATE), local area network (LAN), compression/decompression, encryption/decryption, or other accelerated operations.

Various message formats can be used to configure ACC 120 or MCC 130. In some examples, a P4 program can be compiled and provided to MCC 130 to configure packet processing circuitry 140. The following is a JSON configuration file that can be transmitted from ACC 120 to MCC 130 to get capabilities of packet processing circuitry 140 and/or other circuitry in packet processing device 110. More particularly, the file can be used to specify a number of transmit queues, number of receive queues, number of supported traffic classes (TC), number of available interrupt vectors, number of available virtual ports and the types of the ports, size of allocated memory, supported parser profiles, exact match table profiles, packet mirroring profiles, among others.

When an application launches on host 100, the application can receive a token for target services and gets Uniform Resource Locator (URL) for a target service. An SDN controller or orchestrator (e.g., SDN controller 150) can configure network interface device 110 to select a target service based on number of hops or time to live (TTL) or latency. Based on an application making a call (e.g., REST API) to the target service, network interface device 110 can provide a packet to network interface device 110 to transmit from the application. In some examples, packet processing circuitry 140, ACC 120, and/or MCC 130 can be configured to perform a load balancer to select a target service based on a request from a requester application executing on a host system. Load balancer can perform a lookup into a table (e.g., stored in on die or on chip memory) that identifies target instances for the target service (Service ‘X’). The request or requester can be associated with an SLA that specifies a range of latency values or number of hops to a device that executes the target service, as described herein.

If multiple target services are assigned a TTL range for the requester, load balancing can select a target service based on or more of: round robin, weighted round robin, hash value, destination port, and so forth. In some examples, cores of ACC 120 or MCC 130 can be configured to execute one or more target services and load balancer can select the target service executing on the cores based on a number of hops being zero. In some examples, if a requester does not have an associated SLA that specifies a latency or number of hops to a device that executes the target service, the load balancer can select from among available target services based on service with highest TTL, least recently used, most recently used, or others.

Figure 1B:
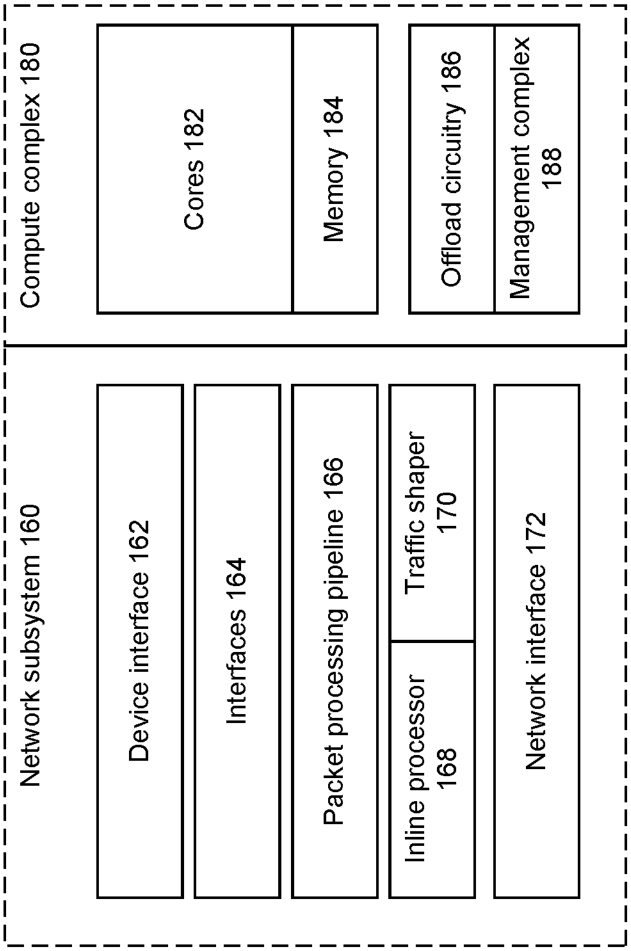
FIG. 1B depicts an example system.

FIG. 1B depicts an example network interface device system. Various examples of packet processing device or data plane circuitry 110 can utilize components of the system of examples described herein. In some examples, packet processing device or network interface device can refer to one or more of: a network interface controller (NIC), a remote direct memory access (RDMA)-enabled NIC, SmartNIC, router, switch, forwarding element, infrastructure processing unit (IPU), or data processing unit (DPU). Network subsystem 160 can be communicatively coupled to compute complex 180. Device interface 162 can provide an interface to communicate with a host. Various examples of device interface 162 can utilize protocols based on Peripheral Component Interconnect Express (PCIe), Compute Express Link (CXL), or others as well as virtual device interface such as virtual device interfaces.

Interfaces 164 can initiate and terminate at least offloaded remote direct memory access (RDMA) operations, Non-volatile memory express (NVMe) reads or writes operations, and LAN operations. Packet processing pipeline 166 can perform packet processing (e.g., packet header and/or packet payload) based on a configuration and support quality of service (QoS) and telemetry reporting. Inline processor 168 can perform offloaded encryption or decryption of packet communications (e.g., Internet Protocol Security (IPSec) or others). Traffic shaper 170 can schedule transmission of communications. Network interface 172 can provide an interface at least to an Ethernet network by media access control (MAC) and serializer/de-serializer (Serdes) operations.

Cores 182 can be configured to perform infrastructure operations such as storage initiator, Transport Layer Security (TLS) proxy, virtual switch (e.g., vSwitch), or other operations. Memory 184 can store applications and data to be performed or processed. Offload circuitry 186 can perform at least cryptographic and compression operations for host or use by compute complex 180. Management complex 188 can perform secure boot, life cycle management and management of network subsystem 160 and/or compute complex 180.

For example, cores 182 can be configured to perform a load balancer to select a target service based on a request from a requester application executing on a host system. The request or requester can be associated with a parameters that specifies a range of latency values or number of hops to a device that executes the target service, as described herein. In some examples, the target service can execute on cores 182.

Figure 2:
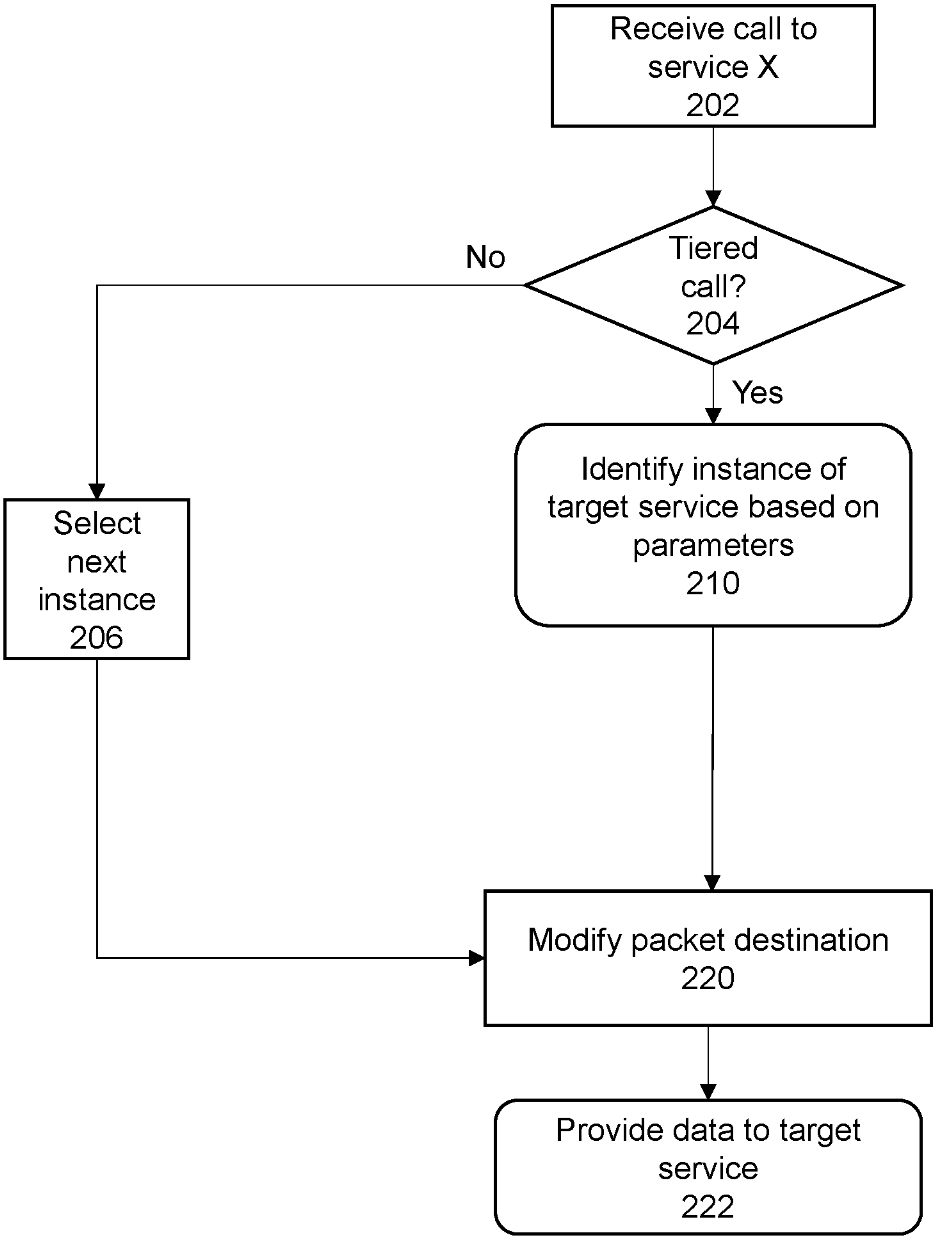
FIG. 2 depicts an example process.

FIG. 2 depicts an example process. For example, a load balancer executed by a processor or circuitry of a network interface device or a host server can perform the process. At 202, a requester (e.g., application, process, service, microservice, VM, container, or others) can issue a call to a target service X. The call can request target service X to perform operations such as data encryption, data decryption, inference operations, generative artificial intelligence (AI) operations, or others. At 204, a determination can be made if the call is a tiered call so that the target service X is to be selected based on a range of TTL values. If the target service is not subject to a range of TTL values, then the process can proceed to 206 and an instance of target service X can be selected by not considering TTL. If the call is subject to a range of TTL values, then the process can continue to 210, and an instance of target service X can be selected by considering a range of TTL values.

At 206, one or more load balancing techniques can be utilized to select from among available instances of the target service. The instances of target service X can be executed by a host connected to the network interface device, or a platform accessible using one or more transmitted packets. For example, the load balancer can select a target service X based on instances of target service X without considering TTL or number of hops to a platform that executes the target service X. For example, the load balancer can select an instance of target service X based on: round robin, weighted round robin, strict priority, hash, least recently used, or others.

At 210, selection of an instance of the target service can occur based at least on considering a range of TTL values and potentially other factors. For example, a data structure that includes information of the following Table 1 identifies instances of target service X by TTL value.

TABLE 1

| Target destination IP address | Latency (e.g., number of hops or TTL) |
|---|---|
| 10.23.22.11:683 | 12 |
| 10.3.122.311:23683 | 6 |
| 10.225.2.39:3367 | 16 |
| 10.23.22.53:22395 | 2 |
| Localhost (e.g., 127.0.0.1) | 0 |
| Network interface device core (e.g., 127.0.0.2) | 0 |

For example, if there are multiple layers of a service level agreement (SLA) (e.g., Good, Better, Best), a TTL of 10 or more can be assigned to a Good tier, a TTL range between 2 and 9 can be assigned to Better tier, and a TTL range from 0 to 2 can be assigned to a Best tier. Based on the SLA for the requester being associated with Good tier, the instances of the target service with a TTL of 12 or 16 can be selected. From the available candidate target service instances, a selection can be made based on round robin, weighted round robin, strict priority, least recently used, or others. If two or more instances of service X meet the TTL criteria, the target instance can be selected based on a load balancing scheme (e.g., round robin, weighted round robin, hash, least recently used, or others). For example, for a tier of service associated with the request being Good, the target instance with destination IP address of 10.23.22.11:683 can be selected and this information can be used to modify the destination of the request packet, in operation 220.

If the requester or request has an associated best level tier, the TTL range could be between 0 and 1 and the cloud service provider (CSP) could have an instance of the Service X running within the local host or network interface device. The selected target can be associated with a local IP:port on the local system, such as a local host or network interface device. In some cases, the destination IP address of the compute complex of the network interface device or the network interface device can be used as the target destination IP address. In such example, at 220, a destination IP address of a request packet can be routed to the local instance of the target service and processed by the target service X. For example, a virtual switch or remote procedure call or pointer passing can route the packet or data to the local instance of the target instance executing on host or network interface device. For example, if service X is a service that performs encryption, then the local running service X could utilize on-chip encryption accelerator capabilities.

Function as a service (FaaS) is a category of cloud computing services that allows development, execution, and management of application functionalities independent from building and maintaining infrastructure associated with developing and launching an application. A FaaS (Fn) application can be implemented in a Virtual Machine (VM), container, process, or other code segment. Code of an Fn can be compiled and the executable program packaged with libraries in a file system. As a FaaS application can execute for a relatively short-lived duration, a start-up duration of the FaaS application can impact the time-to-completion of the FaaS application and whether a service level agreement (SLA) of the FaaS application is met. Constructing an execution environment for the FaaS application can be divided into running execution environments (VM, container, process) and packaging image or file systems information (including code, libraries).

For example, a Kubernetes (K8S) orchestrator provides access to a centralized image registry that stores components of K8S applications (e.g., operating system-level packages, application packages, container images, and others). An orchestrator can perform container management operations to manage downloading of container images, such as pulling and caching container images in a host or network interface device, to be used to construct execution environments. However, if the centralized management privilege is misused, container components may be tampered with and containers can be booted with unverified or unauthorized components.

A host can offload preparation of a container image bundle to a network interface device in a secure manner. Various examples can accelerate startup of containers in a secure manner via a network interface device. Instead of constructing and downloading container related images and filesystems (e.g., execution code, library, etc.) in a host, a trusted network interface device can perform downloading of container images and perform file system bundling construction. Some examples provide for encrypting components (e.g., images and filesystems) stored in a memory or cache in a network interface device and the network interface device constructing and deploying execution environments based on the encrypted components. The network interface device can provide the deployed execution environments to a host for execution via a device interface. Resources of a host server (e.g., central processing unit (CPU), memory, storage, or others) can be saved by offloading construction of containers to a network interface device. In some cases, cold startup time of containers can be reduced.

Encryption of container components can provide isolation of image files among different tenants. For example, cloud service providers (CSPs) or communications service providers (CoSPs) can provide capability to tenants to construct container images using particular image files for tenants that own or manage clusters of containers or cluster of pods and encryption of image files can control tenants that can access particular image files. For example, for certain tenants, construction of a container's bundle or container image's root file system (rootfs) can be offloaded to network interface device, the network interface device can encrypt and store an encrypted unpacked rootfs, and the network interface device can construct containers for those tenants by decryption of rootfs based on keys assigned to those tenants. Some examples can comply with Cloud Native Computing Foundation Confidential Containers in a K8S cluster by isolating images of tenants from images of other tenants by use of confidential computing environments and encryption of image files in a network interface device. Generating containers at the network interface device can potentially shrink a window of attack on container deployment.

For example, the network interface device can generate an encrypted block device which includes container bundles for the containers. The containers can be part of a K8S Pod and merely the pod owner with the decryption keys can access the unpacked container files (e.g., rootfs, or others) in the encrypted network interface device. Accordingly, network interface device can perform one or more of: (1) accelerate the container image preparations for the containers in the same pod and (2) provide the isolated container image bundles to different K8S pods. Various examples can accelerate the image construction for containers (e.g., executable file, libraries) in different Pods with a security manner via trusted network interface devices.

Figure 3:
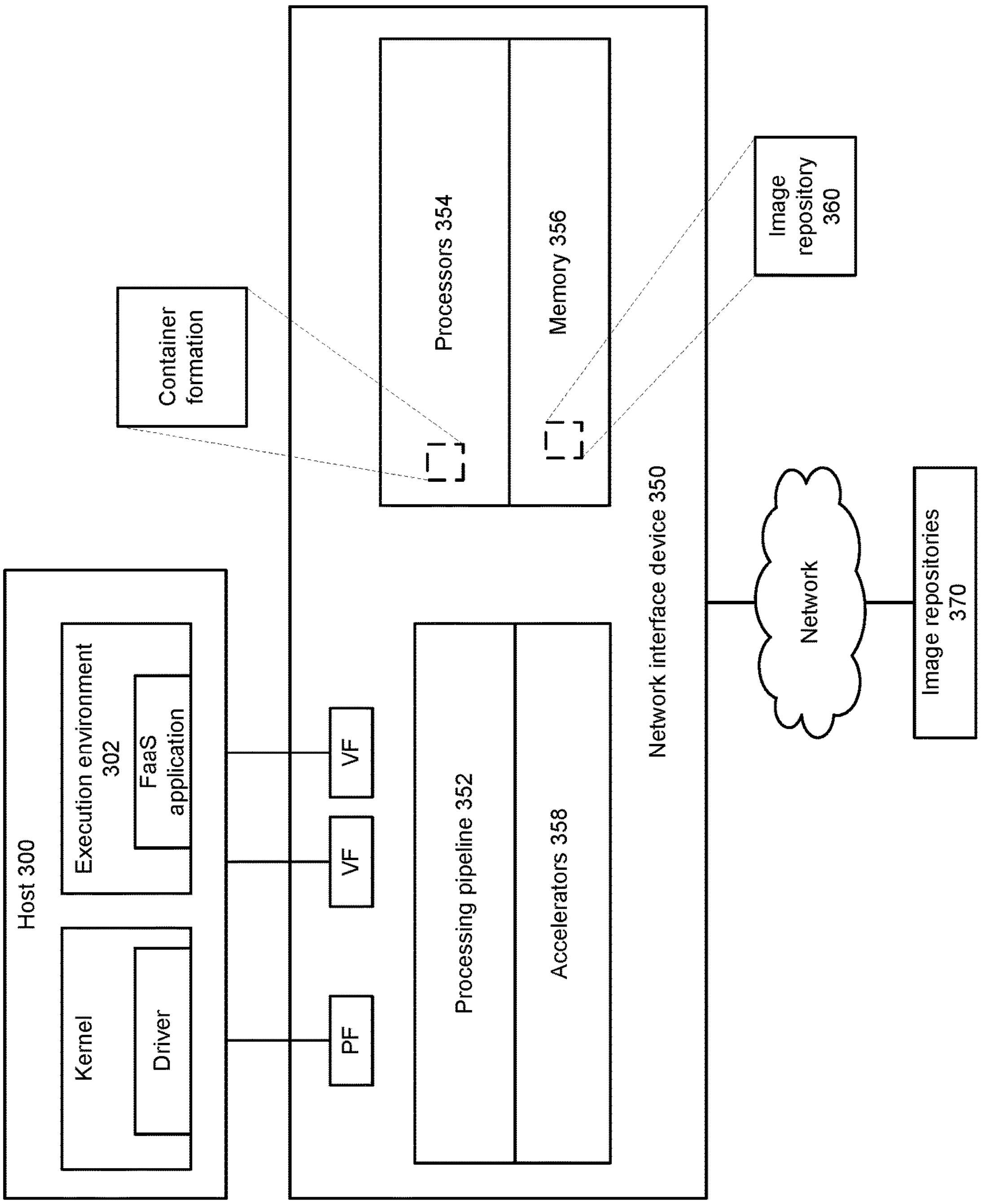
FIG. 3 depicts an example system.

FIG. 3 depicts an example system. Host 300 can include one or more processors, one or more memory devices, one or more device interfaces, as well as other circuitry and software described at least with respect to one or more of FIGS. 8 and 9. Processors (not shown) of host 300 can execute software such as applications or FaaS applications (e.g., microservices, virtual machine (VMs), microVMs, containers, processes, threads, or other virtualized execution environments), operating system (OS), and one or more device drivers. For example, an application executing on host 300 can utilize network interface device 350 to receive or transmit packets. In some examples, an OS or device driver executed by host 300 can configure network interface device 350 to perform container image construction operations using encrypted and trusted devices.

Network interface device 350 can include at least packet processing pipeline circuitry 352, processors 354, memory 356, and accelerators 358 as well as other circuitry and software. Various examples of network interface device 350 are described in one or more of FIGS. 7-9. Processing pipeline circuitry 352 can be implemented using one or more of: application specific integrated circuit (ASIC), field programmable gate array (FPGA), processors executing software, or other circuitry. Various examples of packet processing pipeline circuitry 352 are described herein such as but not limited to programmable pipeline 904 of FIG. 9.

In circuitry and software of network interface device 350, a confidential computing environment or secure enclave can be created using one or more of: total memory encryption (TME), multi-key total memory encryption (MKTME), Trusted Domain Extensions (TDX), Double Data Rate (DDR) encryption, function as a service (FaaS) container encryption or an enclave/TD (trust domain), Intel® SGX, Intel® TDX, AMD Memory Encryption Technology, AMD Secure Memory Encryption (SME) and Secure Encrypted Virtualization (SEV), AMD Secure Encrypted Virtualization-Secure Nested Paging (AMD SEV-SNP), ARM® TrustZone®, ARM® Realms and Confidential Compute, Apple Secure Enclave Processor, Qualcomm® Trusted Execution Environment, Distributed Management Task Force (DMTF) Security Protocol and Data Model (SPDM) specification, virtualization-based isolation such as Intel VT-d and AMD-v, or others.

To perform image construction at least of an FaaS application, network interface device 350 can perform one or more of: (1) access a base image or template of the FaaS application from image repositories 370 or a cache of a base image or template of FaaS application from image repository 360 in memory 356; (2) access an encrypted tenant specific image or template from image repository 360; (3) construct images of FaaS applications by merging the base image with a dynamic image portion (e.g., execution binary with libraries for related FaaS function(s)) and decrypted tenant specific image or template; (4) utilize software storage acceleration software path (e.g., Non-volatile Memory express (NVMe) over fabrics (NVMe-oF) or virtio target) for transport (e.g., NVMe Protocol Initiator) to export the image as a physical function (PF) or virtual function (VF) device to host 300 (e.g., PF and VF are associated with Single Root I/O Virtualization (SR-IOV) and/or Peripheral Component Interconnect Express (PCIe)); and/or (5) host 300 to directly access the PF or pass through the VF to the VMs, containers, or other environments executing the FaaS application. Thereafter, host 300 can mount the device and start the FaaS application.

At a request of host 300, processing pipeline 352, or processors 354, one or more accelerators 358 can perform one or more of: lookaside crypto Engine (LCE) (e.g., compression or decompression), Address Translation Engine (ATE) (e.g., input output memory management unit (IOMMU) to provide virtual-to-physical address translation), local area network (LAN) packet transmissions or receipts, compression/decompression, encryption/decryption, or other operations. For example, to compress image or templates prior to storage in image repository 360, encryption and compression operations of accelerators 358 can be utilized. For example, after access of image or templates from image repository 360, decompression and decryption operations of accelerators 358 can be performed.

After construction of an execution environment 302 (e.g., container, VMs, processes, services, micro-services, threads, applications, or others), network interface device 350 can export virtio_blk PF or VF or other PFs or VFs (e.g., NVMe device) to host 300 to provide access to the container. Network interface device 350 can create virtual host controller (vhost ctrlrs). Network interface device 350 can construct a root file system (rootfs) of a container. Host 300 can mount the bdevs created from virtio-blk PF or VF, and can find container image bundles (e.g., container rootfs) under the mounted directories. Network interface device 350 can configure and start the Storage Performance Development Kit (SPDK)-based block target, open management interface of block related device, and construct block related vhost device. Network interface device 350 can create lvol bdev and copy unpacked container image, create lvol bdev and export it through network block devices (NBD), format the nbd block device and mount it to a folder to copy downloaded/cached container image bundles, and create snapshot from the lvol bdev and then create clone from snapshot. Network interface device 350 can map lvol bdev as backend storage for a blk device exported by the block target, such as mapping the clone bdev to specific port of blk device.

When the container runtime software is notified that the rootfs of the container is prepared, host 300 can use Modprobe virtio_blk or NVMe driver in the kernel to initialize block device, create VF from virtio_blk or NVMe PF and initialize block device from the VF for access to the VM, and mount the obtained block device and use the container image in mounted directories.

Examples of scripts to create a block related device (e.g., rpc.py script) and create lvol bdev and export it through NBD are as follows:

dd if=/dev/zero of=image_test.file bs=1 M count=512

```
./scripts/rpc.py scripts/rpc.py bdev_aio_create image_test.file aio0 4096
./scripts/rpc.py scripts/rpc.py bdev_lvol_create_lvstore aio0 lvol0
./scripts/rpc.py scripts/rpc.py bdev_lvol_create –1 lvol0 bdev_lvol0 768
./scripts/rpc.py scripts/rpc.py nbd_start_disk lvol0/bdev_lvol0/dev/nbd0
```

Examples of scripts to format the NBD block device and copy unpacked container image are as follows:

```
mkfs -t ext4/dev/nbd0
mkdir/mnt/test_for_nbd
mount/dev/nbd0/mnt/test_for_nbd/
cp -r busybox_bundle/mnt/test_for_nbd/
./scripts/rpc.py nbd_stop_disk/dev/nbd0
```

Examples of scripts to create a snapshot and clone from lvol bdev are as follows:

```
./scripts/rpc.py bdev_lvol_snapshot lvol0/bdev_lvol0 snap_bdev_lvol0
./scripts/rpc.py bdev_lvol_clone lvol0/snap_bdev_lvol0 clon0
./scripts/rpc.py bdev_lvol_clone lvol0/snap_bdev_lvol0 clon1
./scripts/rpc.py bdev_lvol_clone lvol0/snap_bdev_lvol0 clon2
//The 3 bdevs can be used by 3 different containers. Map cloned bdevs to different port of blk related devices
```

Figure 4:
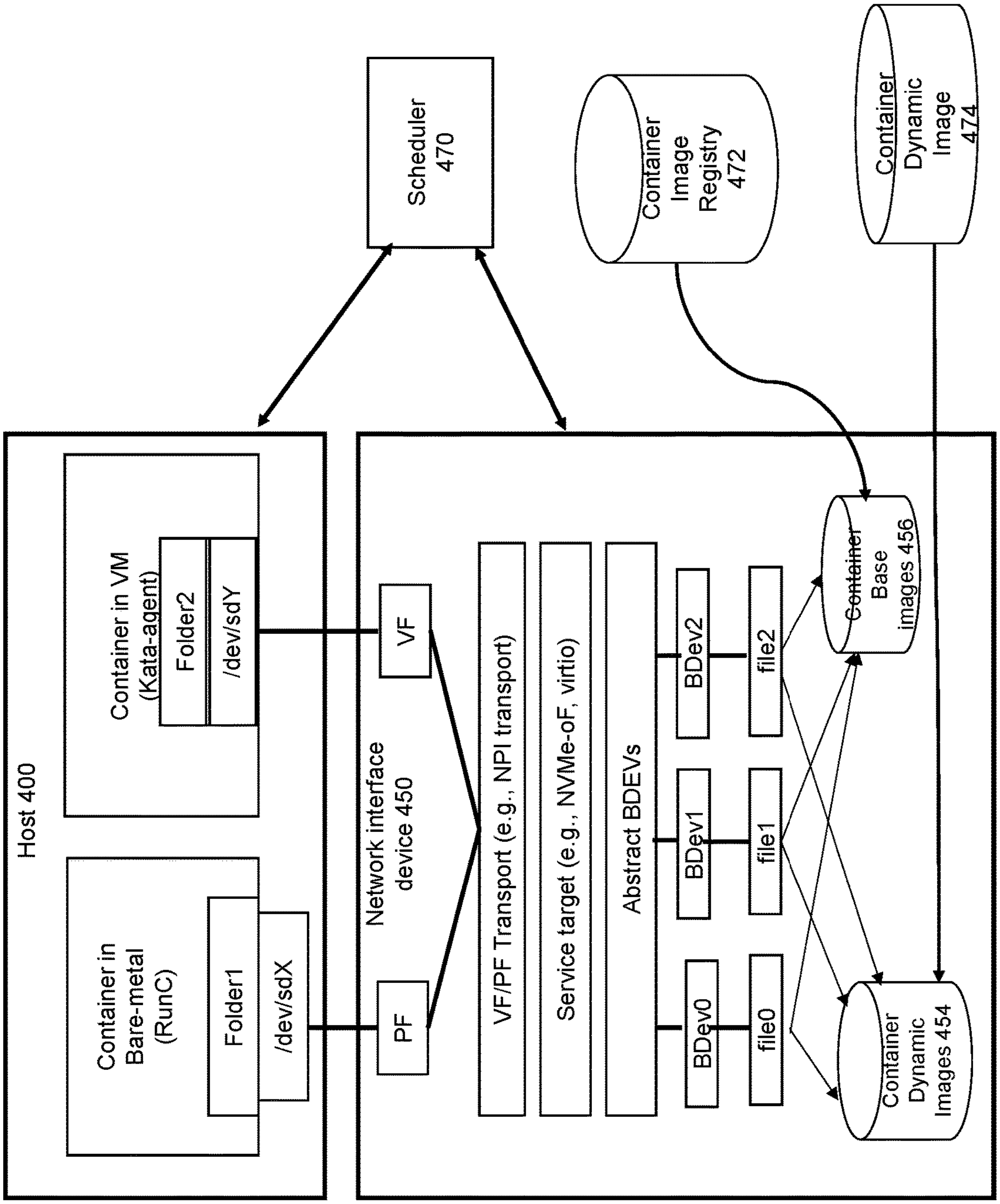
FIG. 4 depicts an example system.

FIG. 4 shows an architecture to accelerate image construction and accelerate start-up of FaaS applications by use of a network interface device. Host 400 can include one or more processors to execute FaaS applications in VMs, containers, or processes. Various examples of host 400 are described at least with respect to FIGS. 8 and/or 9. Network interface device 450 can provide image and filesystems of a FaaS application for execution by host 400. Various examples of network interface device 450 are described at least with respect to FIGS. 7, 8, and/or 9.

The following operations can be performed to construct an execution environment for a FaaS application. By performing one or more of (1) to (8), host 400 can save utilization of CPU, memory, storage resources as host 400 does not need to construct at least a file system again for one or more FaaS. At (1), scheduler 470 can communicate with network interface device 450 in response to receipt of a FaaS execution request from network interface device 450 to request providing an image bundle (e.g., rootfs) of a container or other execution environment. Scheduler 470 can be implemented as one or more of: Kubernetes (K8S), containerd, runC, Kata Containers, or others. Network interface device 450 can receive a task request that may include a code segment from a task dispatcher of scheduler 470. The task request can identify the code segment in one or more programming languages or specify which container images are to be downloaded.

At (2), network interface device 450 can retrieve a base image (e.g., root file system (root fs)) from base container image registry 472 and store the base image into container base images 456 if the base image is not stored in container base images 456 in memory accessible to network interface device 450. A base image can include a common OS environment with execution environment for one or more languages (e.g., Java, C++, Python, etc.). If multiple FaaS application use the same base image, the base image can be stored and retrieved from container base images 456 to lessen amount of time spent retrieving the base image for a common image. Base container image registry 472 can be allocated in a memory or storage device accessible to network interface device 450 through communications of one or more packets. Container base images 456 can be allocated in a memory in network interface device 450, host 400, or accessible to network interface device 450.

At (3), network interface device 450 can prepare a root file system for an FaaS application. For example, Storage Performance Development Kit (SPDK) block device layer (bdev) is a C library that provides an operating system block storage layer that interfaces with device drivers in a kernel storage stack. In network interface device 450, an SPDK based block service target (e.g., NVMe-oF, vhost) can be utilized with SPDK's lvol's snapshot feature.

At (4), network interface device 450 can unpack the image from registry 472 or container base images 456 into a block device (bdev) exported by a service target (e.g., service daemon block) running on network interface device 450 (e.g., NVMe or iSCSI target), and a root file system (rootfs) can be accessed and operated in host 400. Host 400 can execute rootfs within a container or other virtual execution environment for FaaS application. Aside from rootfs, more layers can be prepared with bdev snapshot or cloned features.

At (5), network interface device 450 can compress base images for storage in container base images 456 and subsequent access. A base image can be consistent with Open Container Initiative and can access a file system.

At (6), network interface device 450 can cross-compile the received code segment with the required language (e.g., C++) with pre-stored libraries and generate a customized image of container dynamic images 454. Dynamic images 454 can include one or more executable binaries with related libraries for executing one or more FaaS. For example, if the FaaS is to be executed in C, a dynamic image can include compiled executable binary for the C code with the related dynamic loaded libraries if these libraries are not part of the base image. In some examples, cross-compilation of the received code segment with designated language can be performed by a processor of host 400. Dynamic image compilation can be performed host 400 and/or network interface device 450. Compiled received code can be stored in container dynamic image 474. Container dynamic image 454 can be allocated in a memory or storage device accessible to network interface device 450 through communications of one or more packets. Dynamic container image 474 can be allocated in a memory in network interface device 450, host 400, or accessible to network interface device 450. In some examples, dynamic images 454 can be encrypted prior to storage in memory or storage accessible to network interface device 450 for constructing containers for particular tenants or based on utilization of associated decryption keys. Encryption schemes can include the National Institute of Standards and Technology (NIST) encryption standard for storage such as the advanced encryption system (AES) XTS algorithm with 128-bit keys, 256-bit keys, or other length keys.

After the rootfs is prepared by network device 450, host 400 can start the container, or other execution environment. For example, host 400 can utilize containerd with designated running class to start the container, or other execution environment. For example, Kata Containers execution flow can be used to launch containers.

At (7), network interface device 450 can combine a base image and dynamic image into a file (e.g., Linux® loop device). Container dynamic image 474 can be accessed to retrieve dynamic images into container dynamic images 454. FaaS container images can use an overlay FS format so that network interface device 450 provisions the features to construct FaaS container file systems. Contents in file0, file1 and file2 can include backup files of a loop device (e.g., loop0, loop1, loop2) to store the unpacked image file system of the containers. When executing the FaaS application through the corresponding files on the emulated device provided by network interface device 450, network interface device 450 can perform unpacking operations instead of, or in addition to host 400 performing unpacking operations.

At (8), network interface device 450 can use a virtual block device target service (e.g., NVMe-oF, virtio) with designated transports (e.g., NVMe) to expose a virtual function (VF) or physical function (PF) to host 400. A file can be encapsulated as a block device and those block devices can be used separately or inform virtual bdev in the block service target, such as with an SPDK NVMe-oF target solution framework.

At (9), the block service target export VF/PFs to host 400. Files file0, file1, and file2 can be converted to block devices for host 400. At (10), host 400 can directly use the PF for running the FaaS application in the BareMetal, or pass-through a VF to the VM. At (11), when the VM or host kernel accesses the VF or PF, a block device can be accessed after loading the related device drivers. Host 400 can mount the block device to a specific file system. In some examples, a block device after loading device drivers in the host OS (e.g., /dev/sdc or/dev/nvme2n1) can be used by runC and can be mounted into Folder1 whereas another block device after loading device drivers in the host OS (e.g., /dev/sdc or/dev/nvme2n1) can be used by a VM and mounted into Folder2 in the VM. Host 400 can execute FaaS applications based on file system information exported by network interface device 450.

FIG. 5 depicts an example to construct images. An example operation to construct an execution environment for a FaaS usage scenario can be as follows. Host 500 can include one or more processors to execute applications in one or more VMs, containers, or processes. Various examples of host 500 are described at least with respect to FIGS. 8 and/or 9. Network interface device 520 can provide image and filesystems of a FaaS application for execution by host 500. Various examples of network interface device 520 are described at least with respect to FIGS. 7, 8, and/or 9.

Network interface device 520 can perform one or more of the following operations (0) to (5) to construct and deploy one or more containers in a pod or runtime environment. At (0), orchestrator 550 can authenticate host 500 and network interface device 520 to permit host 500 network interface device 520 to store encrypted images and filesystems of containers associated with one or more K8S pods and provide isolation among containers, for example, at the pod level. Authentication can be based on Trusted Computing Group (TCG) Device Identifier Composition Engine (DICE) standards (e.g., DICE Attestation Architecture Version 1.00 (2020) and earlier versions, revisions, and variations thereof), blockchain-based identities, or other schemes.

At (1), orchestrator 550 (e.g., K8S) can utilize container management tools (e.g., Containerd or Kubernetes Container Runtime Interface CRI-IO) to dispatch execution of containers. Note that reference to containers can instead refer to VMs, processes, services, micro-services, threads, applications, or others. Orchestrator 550 can communicate with host 500 with a pod creation request (e.g., a YAML file). At (1), orchestrator 550 can cause, for a Pod, image management service daemon 522 executing on network interface device 520 to receive container creation requests from image management client executing on host 500. Host 500 can utilize a container running time software (e.g., Containerd) to request and access containers. Network interface device 520 can receive container parameters from orchestrator 550 from a task dispatcher of orchestrator 550.

At (2), network interface device 520 can download a base image from base image registry 560 if the base image is not found in base image registry 524. For a Pod's specific images (e.g., tenant's own container images), network interface device 520 can store container dynamic images from registry 562 in container registry 526 of network interface device 520 as network interface device 520 is trusted by the tenant from a prior authentication. Network interface device 520 can store tenant's own container image registry 526 and unpacked runtime root file system (rootfs) and applications and configuration files (e.g., large language model) in a confidential computing environment or secure enclave so that container images are not accessed while unpacking the images except by use of authorized decryption techniques. Image management client 502 executed by host 500 can transfer a key to network interface device 520 in a secure manner, so that network interface device 520 can encrypt and decrypt the block device in accordance with parameters of the Pod owners. In some examples, base container images can be stored in base image registry 524 as encrypted or unencrypted.

At (3), network interface device 520 can create and format block devices with proper file system format (e.g., ext3). Root file systems of containers can be encapsulated as block devices (BDev) and those block devices can be accessed as virtual block devices in the block service target. If the Pod associated with a container is to provide a security guarantee, the allocated block device can be encrypted. The encrypted block device can be assigned to the TDX protected VMs (e.g., trust domain (TD) VM). Image management service daemon 522 can unpack images from base image registry 524 and tenant's image registry 526 into files in a block device, e.g., BDev0 and BDev1. A virtual block device target service (e.g., NVMe-oF, virtio) with designated transports (e.g., for NVMe) can expose a VF or PF to host 500. For example, to expose a virtual BDev in the block service target to host 500, SPDK NVMe-oF target solution framework can be utilized.

At (4), image management service daemon 522 can notify image management client 502 executed in host 500 of availability to access a container. At (5), the pod which hosts the containers can access the root file systems in the block devices. Host 500 or network interface device 520 can perform a device hotplug to attach a VF or PF to access the unpacked container image or template contents. When the VM or host kernel accesses a VF or PF, a block device can be accessed after loading the related device drivers. For example, for pod0, host 500 can directly access the PF to execute containers in a bare metal environment. A bare metal environment can include a computer system that operates without abase operating system (OS). For pod1, host 500 can provide access to a VF to the VM. The block device can be mounted to a specific file system. For example, file system in /dev/sdX is used by containers in Pod0 and is mounted into Folder1. For example, file system in /dev/sdY assigned to Pod2 and is encrypted, and only the Pod1 owners with the decryption keys can decrypt the contents of the block device. Orchestrator 550 can permit host 500 to access containers spawned by network interface device 520.

FIG. 6 depicts an example process. The process can be performed by a network interface device to perform image construction operations offloaded from a host. As described herein, the network interface device can download images as well as store some images in a memory for subsequent use.

At 602, in response to a request to construct a container image, a network interface device can retrieve a base image from a base container image registry in memory accessible to network interface device or from a network accessible base image repository. Network interface device can store the base image into base container image registry in a memory in or accessible to network interface device (e.g., memory in network interface device and/or memory in host) if the base image is not cached in its base container image registry.

At 604, network interface device can unpack the base image by extracting one or more layers of an image onto the local filesystem. At 606, network interface device can prepare a root file system for an FaaS application into a block device managed by a virtual storage target based on SPDK framework and provision the block device to the host through a VF/PF. The host can discover the VF/PF and identify the VF/PF to a block device (e.g., /dev/sdc) and mount the device with the file system type information given by network interface device. Host can execute rootfs within a container or other virtual execution environment for a FaaS application.

At 608, the network interface device can cross-compile a code segment received from an orchestrator or image manager executing on a host with libraries from and generate an image of container dynamic images. Dynamic images can include one or more executable binaries with related libraries for executing one or more FaaS. In some examples, dynamic images can be encrypted and assigned to specific tenants so that generating an image from container dynamic images can occur by decryption of the dynamic images, as described herein.

At 610, network interface device can combine a decrypted dynamic image and base image into a file. File contents can include unpacked image file system of the containers. Network interface device can perform unpacking work can be avoided in the host side. Network interface device may not directly provide file system service interface to the host and instead provide a simulated block device to the host accessible via VF or PF.

At 612, network interface device can use a virtual block device target service with designated transports to expose a VF or PF to host 400. The file can be encapsulated as a block device and those block devices can be used separately or inform a virtual bdev in the block service target in the network interface device, such as with an SPDK NVMe-oF target solution framework. The network interface device can export VF/PFs to host.

Thereafter, the host can access a block device after loading the related device drivers by accessing accesses the VF/PF. The host can mount the block device to a specific file system. A block device provided by the IPU with no filesystem information cannot be consumed by the FaaS/container. For FaaS and container execution, the host accesses an image bundle (e.g., a rootfs which contains the execution binary, libraries and OS environment). The host can start the container, or other execution environment.

FIG. 7 depicts an example network interface or packet processing device. In some examples, selection of a target process and FaaS image construction operations can be offloaded to network interface device, as described herein. In some examples, packet processing device 700 can be implemented as a network interface controller, network interface card, a host fabric interface (HFI), or host bus adapter (HBA), and such examples can be interchangeable. Packet processing device 700 can be coupled to one or more servers using a bus, PCIe, CXL, or DDR. Packet processing device 700 may be embodied as part of a system-on-a-chip (SoC) that includes one or more processors, or included on a multichip package that also contains one or more processors.

Some examples of packet processing device 700 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 700 can include transceiver 702, processors 704, transmit queue 706, receive queue 708, memory 710, and bus interface 712, and DMA engine 752. Transceiver 702 can be capable of receiving and transmitting packets in conformance with the applicable protocols such as Ethernet as described in IEEE 802.3, although other protocols may be used. Transceiver 702 can receive and transmit packets from and to a network via a network medium (not depicted). Transceiver 702 can include PHY circuitry 714 and media access control (MAC) circuitry 716. PHY circuitry 714 can include encoding and decoding circuitry (not shown) to encode and decode data packets according to applicable physical layer specifications or standards. MAC circuitry 716 can be configured to assemble data to be transmitted into packets, that include destination and source addresses along with network control information and error detection hash values.

Processors 704 can be any a combination of a: processor, core, graphics processing unit (GPU), field programmable gate array (FPGA), application specific integrated circuit (ASIC), or other programmable hardware device that allow programming of network interface 700. For example, a "smart network interface" can provide packet processing capabilities in the network interface using processors 704.

Processors 704 can include one or more packet processing pipeline that can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines can perform one or more of: packet parsing (parser), exact match-action (e.g., small exact match (SEM) engine or a large exact match (LEM)), wildcard match-action (WCM), longest prefix match block (LPM), a hash block (e.g., receive side scaling (RSS)), a packet modifier (modifier), or traffic manager (e.g., transmit rate metering or shaping). For example, packet processing pipelines can implement access control list (ACL) or packet drops due to queue overflow.

Configuration of operation of processors 704, including its data plane, can be programmed based on one or more of: Protocol-independent Packet Processors (P4), Software for Open Networking in the Cloud (SONiC), Broadcom® Network Programming Language (NPL), NVIDIA® CUDA®, NVIDIA® DOCA™, Infrastructure Programmer Development Kit (IPDK), Data Plane Development Kit (DPDK), OpenDataPlane, among others. Processors 704 and/or system on chip 750 can execute instructions to perform selection of a target process and FaaS image construction operations can be offloaded to network interface device, as described herein.

Packet allocator 724 can provide distribution of received packets for processing by multiple CPUs or cores using timeslot allocation described herein or RSS. When packet allocator 724 uses RSS, packet allocator 724 can calculate a hash or make another determination based on contents of a received packet to determine which CPU or core is to process a packet.

Interrupt coalesce 722 can perform interrupt moderation whereby network interface interrupt coalesce 722 waits for multiple packets to arrive, or for a time-out to expire, before generating an interrupt to host system to process received packet(s). Receive Segment Coalescing (RSC) can be performed by network interface 700 whereby portions of incoming packets are combined into segments of a packet. Network interface 700 provides this coalesced packet to an application.

Direct memory access (DMA) engine 752 can copy a packet header, packet payload, and/or descriptor directly from host memory to the network interface or vice versa, instead of copying the packet to an intermediate buffer at the host and then using another copy operation from the intermediate buffer to the destination buffer.

Memory 710 can include volatile and/or non-volatile memory device and can store any queue or instructions used to program network interface 700. Transmit queue 706 can include data or references to data for transmission by network interface. Receive queue 708 can include data or references to data that was received by network interface from a network. Descriptor queues 720 can include descriptors that reference data or packets in transmit queue 706 or receive queue 708. Bus interface 712 can provide an interface with host device (not depicted). For example, bus interface 712 can be compatible with PCI, PCI Express, PCI-x, Serial ATA, and/or USB compatible interface (although other interconnection standards may be used).

Figure 8:
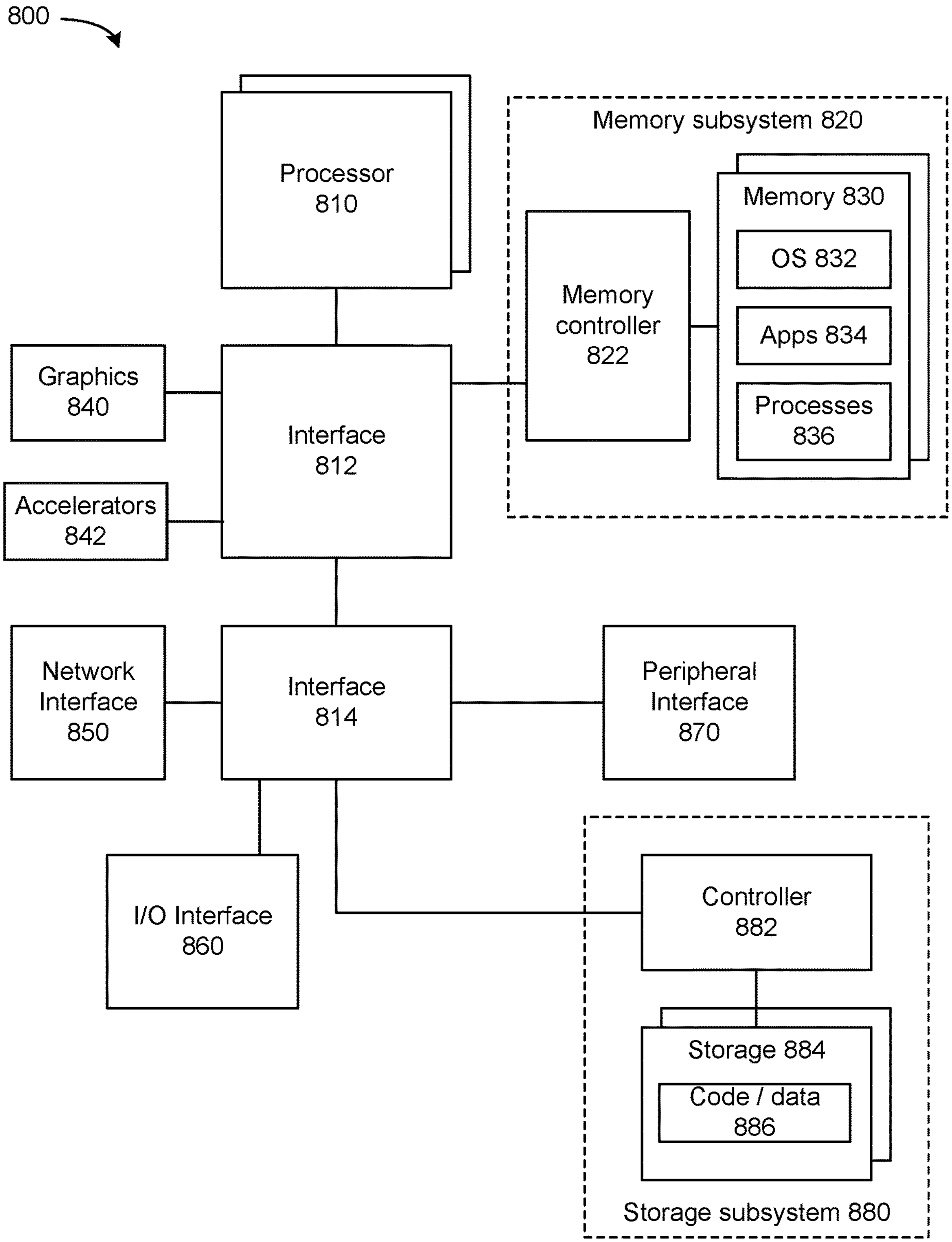
FIG. 8 depicts an example computing system.

FIG. 8 depicts a system. In some examples, operation of programmable pipelines of network interface 850 can configured to perform selection of a target process and FaaS image construction operations can be offloaded to network interface device, as described herein. System 800 includes processor 810, which provides processing, operation management, and execution of instructions for system 800. Processor 810 can include any type of microprocessor, central processing unit (CPU), graphics processing unit (GPU), XPU, processing core, or other processing hardware to provide processing for system 800, or a combination of processors. An XPU can include one or more of: a CPU, a graphics processing unit (GPU), general purpose GPU (GPGPU), and/or other processing units (e.g., accelerators or programmable or fixed function FPGAs). Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 800 includes interface 812 coupled to processor 810, which can represent a higher speed interface or a high throughput interface for system components that needs higher bandwidth connections, such as memory subsystem 820 or graphics interface components 840, or accelerators 842. Interface 812 represents an interface circuit, which can be a standalone component or integrated onto a processor die. Where present, graphics interface 840 interfaces to graphics components for providing a visual display to a user of system 800. In one example, graphics interface 840 can drive a display that provides an output to a user. In one example, the display can include a touchscreen display. In one example, graphics interface 840 generates a display based on data stored in memory 830 or based on operations executed by processor 810 or both. In one example, graphics interface 840 generates a display based on data stored in memory 830 or based on operations executed by processor 810 or both.

Accelerators 842 can be a programmable or fixed function offload engine that can be accessed or used by a processor 810. For example, an accelerator among accelerators 842 can provide data compression (DC) capability, cryptography services such as public key encryption (PKE), cipher, hash/authentication capabilities, decryption, or other capabilities or services. In some cases, accelerators 842 can be integrated into a CPU socket (e.g., a connector to a motherboard or circuit board that includes a CPU and provides an electrical interface with the CPU). For example, accelerators 842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 842 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models to perform learning and/or inference operations.

Memory subsystem 820 represents the main memory of system 800 and provides storage for code to be executed by processor 810, or data values to be used in executing a routine. Memory subsystem 820 can include one or more memory devices 830 such as read-only memory (ROM), flash memory, one or more varieties of random access memory (RAM) such as DRAM, or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810.

Applications 834 and/or processes 836 can refer instead or additionally to a virtual machine (VM), container, microservice, processor, or other software. Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or lightweight container or virtual machine deployment, and decentralized continuous microservice delivery.

A service mesh can include an infrastructure layer for facilitating service-to-service communications between microservices using application programming interfaces (APIs). A service mesh can be implemented using a proxy instance (e.g., sidecar) to manage service-to-service communications. Some network protocols used by microservice communications include Layer 7 protocols, such as Hypertext Transfer Protocol (HTTP), HTTP/2, remote procedure call (RPC), gRPC, Kafka, MongoDB wire protocol, and so forth. Envoy Proxy is a well-known data plane for a service mesh. Istio, AppMesh, and Open Service Mesh (OSM) are examples of control planes for a service mesh data plane.

A virtualized execution environment (VEE) can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network, and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host. In some examples, an operating system can issue a configuration to a data plane of network interface 850.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

In some examples, OS 832 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a processor sold or designed by Intel®, ARM®, AMD®, Qualcomm®, IBM®, Nvidia®, Broadcom®, Texas Instruments®, among others.

In some examples, OS 832 or driver can enable or disable network interface 850 to adjust operation of programmable pipelines of network interface 850 to perform selection of a target process or FaaS image construction operations. The OS or driver can indicate to an application that network interface device 850 is capable to perform selection of a target process or FaaS image construction operations. Network interface device 850 can advertise to OS or driver that an application is to specify a service level used by a network interface device to select a target service or device based on TTL.

While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 800 includes interface 814, which can be coupled to interface 812. In one example, interface 814 represents an interface circuit, which can include standalone components and integrated circuitry. In one example, multiple user interface components or peripheral components, or both, couple to interface 814. Network interface 850 provides system 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can transmit data to a device that is in the same data center or rack or a remote device, which can include sending data stored in memory. Network interface 850 can receive data from a remote device, which can include storing received data into memory. In some examples, network interface 850 or network interface device 850 can refer to one or more of: a network interface controller (NIC), a remote direct memory access (RDMA)-enabled NIC, SmartNIC, router, switch (e.g., top of rack (ToR) or end of row (EoR)), forwarding element, infrastructure processing unit (IPU), or data processing unit (DPU). An example IPU or DPU is described at least with respect to FIG. 7. Network interface device 850 can be implemented as a system on chip (SoC) system with its own network resources (e.g., IP address) and processor, memory, and storage resources.

In one example, system 800 includes one or more input/output (I/O) interface(s) 860. I/O interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, or optical based disks, or a combination. Storage 884 holds code or instructions and data 886 in a persistent state (e.g., the value is retained despite interruption of power to system 800). Storage 884 can be generically considered to be a "memory," although memory 830 is typically the executing or operating memory to provide instructions to processor 810. Whereas storage 884 is nonvolatile, memory 830 can include volatile memory (e.g., the value or state of the data is indeterminate if power is interrupted to system 800). In one example, storage subsystem 880 includes controller 882 to interface with storage 884. In one example controller 882 is a physical part of interface 814 or processor 810 or can include circuits or logic in both processor 810 and interface 814. A volatile memory is memory whose state (and therefore the data stored in it) is indeterminate if power is interrupted to the device.

In an example, system 800 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe (e.g., a non-volatile memory express (NVMe) device can operate in a manner consistent with the Non-Volatile Memory Express (NVMe) Specification, revision 1.3c, published on May 24, 2018 ("NVMe specification") or derivatives or variations thereof).

Communications between devices can take place using a network that provides die-to-die communications; chip-to-chip communications; circuit board-to-circuit board communications; and/or package-to-package communications. A die-to-die communications can utilize Embedded Multi-Die Interconnect Bridge (EMIB) or an interposer.

In an example, system 800 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Figure 9:
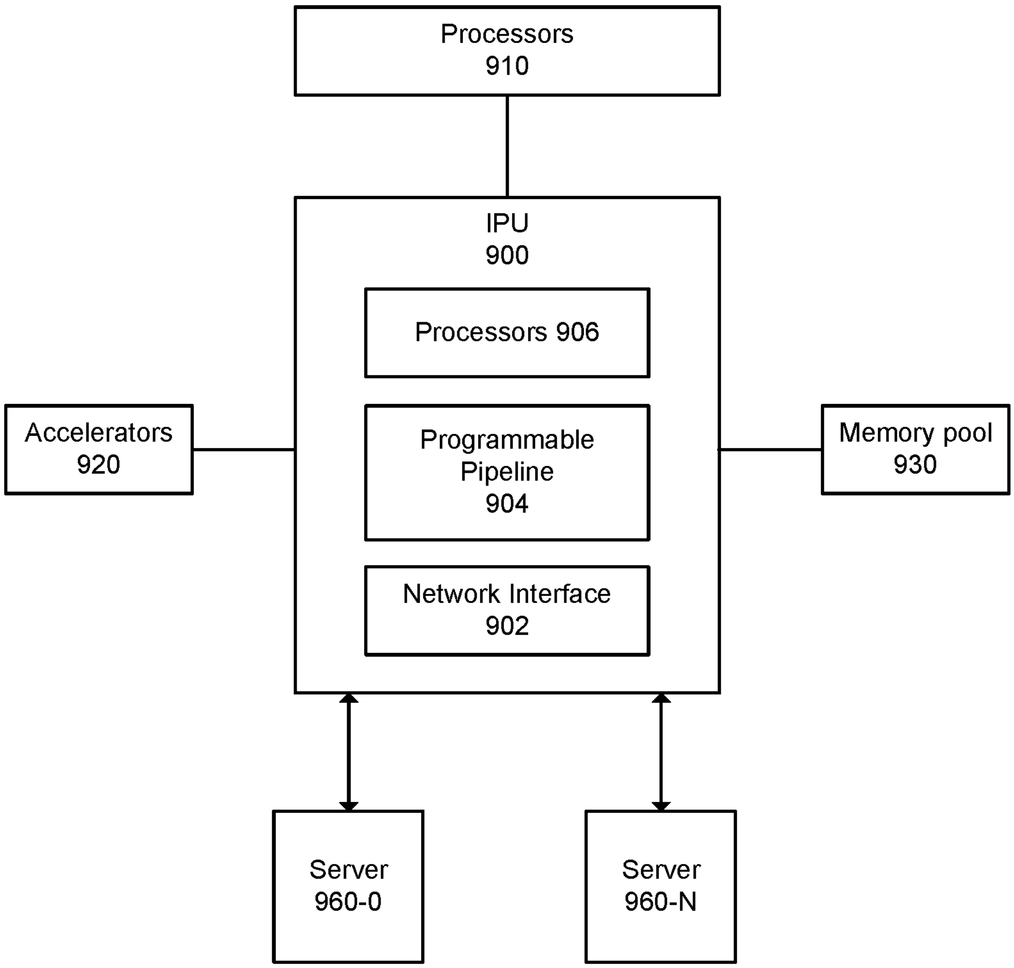
FIG. 9 depicts an example computing system.

FIG. 9 depicts an example system. In this system, IPU 900 manages performance of one or more processes using one or more of processors 906, processors 910, accelerators 920, memory pool 930, or servers 960-0 to 960-N, where N is an integer of 1 or more. In some examples, processors 906 of IPU 900 can execute one or more processes, applications, VMs, containers, microservices, and so forth that request performance of workloads by one or more of: processors 910, accelerators 920, memory pool 930, and/or servers 960-0 to 960-N. IPU 900 can utilize network interface 902 or one or more device interfaces to communicate with processors 910, accelerators 920, memory pool 930, and/or servers 960-0 to 960-N. IPU 900 can utilize programmable pipeline 904 to process packets that are to be transmitted from network interface 902 or packets received from network interface 902. Programmable pipeline 904 and/or processors 906 can be configured to perform selection of a target process and FaaS image construction operations can be offloaded to network interface device, as described herein.

Examples herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), micro data center, on-premise data centers, off-premise data centers, edge network elements, fog network elements, and/or hybrid data centers (e.g., data center that use virtualization, serverless computing systems (e.g., Amazon Web Services (AWS) Lambda), content delivery networks (CDN), cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z."

Illustrative examples of the devices, systems, and methods disclosed herein are provided below. An embodiment of the devices, systems, and methods may include one or more, and combination of, the examples described below.

Example 1 includes an apparatus that includes a network interface device that includes: a network interface and circuitry to: receive a request to perform a service and select a servicing node based on network latency and/or proximity of the requested service to the network interface device, wherein a proximity of the requested service includes execution in the network interface device.

Example 2 includes one or more examples, wherein the circuitry is to associate a quality of service with the request, wherein the quality of service comprises a range of number of network device hops to the servicing node.

Example 3 includes one or more examples, wherein the circuitry is to: based on the quality of service, select an instance of the requested service that is executed by the network interface device.

Example 4 includes one or more examples, wherein the circuitry is to: based on the quality of service, select an instance of the requested service that is executed by a server that executes an issuer of the request to perform the service.

Example 5 includes one or more examples, wherein the circuitry is to: based on the quality of service, select an instance of the requested service that is executed by a server in a same rack as a server that executes an issuer of the request to perform the service.

Example 6 includes one or more examples, wherein the network interface device comprises: second circuitry that is to: in response to a request to construct a container, construct the container from an encrypted root file system and provide access to the container to a host system.

Example 7 includes one or more examples, wherein the network interface device comprises one or more of: network interface controller (NIC), SmartNIC, router, forwarding element, infrastructure processing unit (IPU), or data processing unit (DPU).

Example 8 includes one or more examples, and includes a server that executes a process that is to issue the request, wherein the process is to specify a quality of service for the request.

Example 9 includes one or more examples, and includes at least one non-transitory computer-readable medium comprising instructions stored thereon, that if executed by one or more processors, cause the one or more processors to: configure a network interface device to: associate a quality of service with a request to perform a service; and select a servicing node based on network latency and/or proximity of the requested service to the network interface device, wherein a proximity of the requested service includes execution in the network interface device.

Example 10 includes one or more examples, wherein the quality of service comprises a range of number of network device hops to the servicing node.

Example 11 includes one or more examples, and includes instructions stored thereon, that if executed by one or more processors, cause the one or more processors to: based on the quality of service, select an instance of the requested service that is executed by the network interface device.

Example 12 includes one or more examples, and includes instructions stored thereon, that if executed by one or more processors, cause the one or more processors to: based on the quality of service, select an instance of the requested service that is executed by a server that executes an issuer of the request to perform the service.

Example 13 includes one or more examples, and includes instructions stored thereon, that if executed by one or more processors, cause the one or more processors to: based on the quality of service, select an instance of the requested service that is executed by a server in a same rack as a server that executes an issuer of the request to perform the service.

Example 14 includes one or more examples, and includes instructions stored thereon, that if executed by one or more processors, cause the one or more processors to: in response to a request to construct a container, construct the container from an encrypted root file system and provide access to the container to a host system.

Example 15 includes one or more examples, and includes a method that includes: determining a quality of service with a request to perform a service and selecting a servicing node based on network latency and/or proximity of the requested service to a network interface device, wherein a proximity of the requested service includes execution in the network interface device.

Example 16 includes one or more examples, wherein the quality of service comprises a range of number of network device hops to the servicing node.

Example 17 includes one or more examples, and includes based on the quality of service, select an instance of the requested service that is executed by the network interface device.

Example 18 includes one or more examples, and includes based on the quality of service, select an instance of the requested service that is executed by a server that executes an issuer of the request to perform the service.

Example 19 includes one or more examples, and includes based on the quality of service, select an instance of the requested service that is executed by a server in a same rack as a server that executes an issuer of the request to perform the service.

Example 20 includes one or more examples, and includes in response to a request to construct a container, construct the container from an encrypted root file system and provide access to the container to a host system.

The invention claimed is:

1. A network interface device comprising:

a host interface;

a direct memory access (DMA) circuitry; and a network interface and circuitry to:

receive a request to perform a service;

select a servicing node based on network latency and proximity of the requested service to the network interface device, wherein the proximity of the requested service includes execution in the network interface device;

for the request to perform the service, select the network interface device to perform the service.

2. The network interface device of claim 1, wherein the circuitry is to associate a quality of service with the request, wherein the quality of service comprises a range of number of network device hops to the servicing node.

3. The network interface device of claim 1, wherein the circuitry is to:

based on a quality of service, select an instance of the requested service that is executed by the network interface device.

4. The network interface device of claim 1, wherein the circuitry is to:

based on a quality of service, select an instance of the requested service that is executed by a server that executes an issuer of the request to perform the service.

5. The network interface device of claim 1, wherein the circuitry is to:

based on a quality of service, select an instance of the requested service that is executed by a server in a same rack as a server that executes an issuer of the request to perform the service.

6. The network interface device of claim 1, comprising:

second circuitry that is to:

in response to a request to construct a container, construct the container from an encrypted root file system and provide access to the container to a host system.

7. The network interface device of claim 1, wherein the network interface device comprises one or more of: network interface controller (NIC), SmartNIC, router, forwarding element, infrastructure processing unit (IPU), or data processing unit (DPU).

8. The network interface device of claim 1, comprising a server that executes a process that is to issue the request, wherein the process is to specify a quality of service for the request.

9. The network interface device of claim 1, wherein the circuitry is to:

for a second request to perform a second service, select a second servicing node remote from the network interface device to perform the second service based on second network latency and second proximity of the second service to the network interface device.

10. At least one non-transitory computer-readable medium comprising instructions stored thereon, that when executed by one or more processors, cause the one or more processors to:

configure a network interface device to:

associate a quality of service with a request to perform a service; and select a servicing node based on network latency and proximity of the requested service to the network interface device, wherein the proximity of the requested service includes execution in the network interface device;

for the request to perform the service, select the network interface device to perform the service.

11. The at least one non-transitory computer-readable medium of claim 10, wherein the quality of service comprises a range of number of network device hops to the servicing node.

12. The at least one non-transitory computer-readable medium of claim 10, comprising instructions stored thereon, that when executed by one or more processors, cause the one or more processors to:

configure the network interface device to:

based on the quality of service, select an instance of the requested service that is executed by the network interface device.

13. The at least one non-transitory computer-readable medium of claim 10, comprising instructions stored thereon, that when executed by one or more processors, cause the one or more processors to:

configure the network interface device to:

based on the quality of service, select an instance of the requested service that is executed by a server that executes an issuer of the request to perform the service.

14. The at least one non-transitory computer-readable medium of claim 10, comprising instructions stored thereon, that when executed by one or more processors, cause the one or more processors to:

configure the network interface device to:

based on the quality of service, select an instance of the requested service that is executed by a server in a same rack as a server that executes an issuer of the request to perform the service.

15. The at least one non-transitory computer-readable medium of claim 10, comprising instructions stored thereon, that when executed by one or more processors, cause the one or more processors to:

configure the network interface device to:

in response to a request to construct a container, construct the container from an encrypted root file system and provide access to the container to a host system.

16. The at least one non-transitory computer-readable medium of claim 10, comprising instructions stored thereon, that when executed by one or more processors, cause the one or more processors to:

configure the network interface device to:

for a second request to perform a second service, select a second servicing node remote from the network interface device to perform the second service based on second network latency and second proximity of the second service to the network interface device.

17. A method performed by a network interface device comprising a host interface, network interface, and direct memory access (DMA) circuitry, the method comprising:

determining a quality of service associated with a request to perform a service;

selecting a servicing node based on network latency and proximity of the requested service to a network interface device, wherein the proximity of the requested service includes execution in the network interface device;

selecting, for the request to perform the service, the network interface device to perform the service.

18. The method of claim 17, wherein the quality of service specifies a limit on number of network device hops to the servicing node.

19. The method of claim 17, further comprising:

selecting, based on the quality of service, an instance of the requested service that is executed by the network interface device.

20. The method of claim 17, further comprising:

selecting, based on the quality of service, an instance of the requested service that is executed by a server that executes an issuer of the request to perform the service.

21. The method of claim 17, further comprising:

selecting, based on the quality of service, an instance of the requested service that is executed by a server in a same rack as a server that executes an issuer of the request to perform the service.

22. The method of claim 17, further comprising:

constructing, in response to a request to construct a container, the container from an encrypted root file system and providing access to the container to a host system.

23. The method of claim 17, further comprising:

selecting, for a second request to perform a second service, a second servicing node remote from the network interface device to perform the second service based on second network latency and second proximity of the second service to the network interface device.

* * * * *